United States Patent [19]

Tolbert et al.

[11] Patent Number: 4,935,281
[45] Date of Patent: Jun. 19, 1990

[54] FLAME BARRIER OFFICE BUILDING MATERIALS

[75] Inventors: Thomas W. Tolbert, Fort Mill; James E. Hendrix, Spartanburg, both of S.C.; Jeffery S. Dugan, Charlotte, N.C.

[73] Assignee: Springs Industries, Inc., Fort Mill, S.C.

[21] Appl. No.: 333,501

[22] Filed: Apr. 5, 1989

[51] Int. Cl.⁵ ............................................. B32B 15/00
[52] U.S. Cl. ................................... 428/116; 428/182; 428/248; 428/249; 428/252; 428/253; 428/285; 428/286; 428/287; 428/921
[58] Field of Search ............... 428/332, 116, 182, 248, 428/249, 252, 253, 285–287, 921

[56] References Cited

U.S. PATENT DOCUMENTS

| | | |
|---|---|---|
| 2,830,925 | 4/1958 | Fennelbresque . |
| 3,382,136 | 5/1968 | Bugel et al. . |
| 3,682,675 | 8/1972 | Myers . |
| 3,873,409 | 3/1975 | Jehier . |
| 3,874,980 | 4/1975 | Richards et al. . |
| 4,020,225 | 4/1977 | Fujiwara et al. . |
| 4,073,998 | 2/1978 | O'Connor . |
| 4,446,191 | 5/1984 | Miyadera et al. . |
| 4,693,926 | 9/1987 | Kowalski et al. . |
| 4,759,964 | 7/1988 | Fischer et al. ............... 428/921 |

OTHER PUBLICATIONS

Promotional Brochure, Lydall, Inc., Manning Division, Entitled: Building Products.

Primary Examiner—Marion C. McCamish
Attorney, Agent, or Firm—Bell, Seltzer, Park & Gibson

[57] ABSTRACT

A flame-resistant office building material for use as office panel partitions, wall panels, wall coverings, ceiling panels, floor and the like is provided. The building material comprises a rigid core support material, a decorative outer surface layer, and a fiber-based flame barrier layer positioned between the support material and the surface layer. The barrier layer comprises a flame durable fabric substrate formed of fire-resistant fibers.

14 Claims, 1 Drawing Sheet

FLAME BARRIER OFFICE BUILDING MATERIALS

FIELD AND BACKGROUND OF THE INVENTION

This invention relates to a building material which has improved flame resistance properties. More particularly, the present building material may be used in offices such as for office panel partitions, wall panels, wall coverings, ceiling panels, flooring and the like.

Building materials for offices conventionally comprise a core of a rigid support material such as fiberboard or a polymeric material which is covered by a decorative fabric. The building materials and particularly the rigid core, however, are typically highly flammable and form dense and toxic smoke on exposure to a flame. Thus a significant fire hazard to people and property exists in buildings where such materials are used in abundance.

Manufacturers of these materials have attempted to reduce these hazards by making the partitions less flammable by placing a layer of aluminum or other non-flammable material between the decorative fabric and the flammable core. These constructions, however, tend to be bulky and heavy, and the non-flammable material often reduces the aesthetic appeal of the building material because the non-flammable material is not easily hidden by the decorative fabric. Additionally, many non-flammable materials such as sheet aluminum are expensive, and thus building materials incorporating them are cost prohibitive.

An alternative is to coat or impregnate the core and/or the decorative fabric with a flame retardant composition. Exemplary compositions include those based on an inorganic hydrated compound such as hydrated alumina, hydrated magnesia, magnesium oxychloride, hydrated zinc borate, and hydrated calcium borate. These flame retardant compounds, however, are expensive and also adversely affect the aesthetic appeal of the building material.

SUMMARY OF THE INVENTION

The present invention provides an office building material having improved flame resistance properties. The present building material may be used to limit the spread of a fire and reduces the fire and health hazards associated with conventional core materials and the building materials made therewith. The office building material comprises a rigid core support material, a decorative surface layer and a fiber-based flame barrier layer positioned between the core support material and the decorative surface layer. The flame barrier layer comprises a flame durable fabric substrate and a flexible metal foil layer carried by the fabric substrate and oriented toward the core support material. The present building material is lightweight, inexpensive and may be used for a variety of end uses.

BRIEF DESCRIPTION OF THE DRAWINGS

Some of the features and advantages of the invention having been stated, others will appear as the description proceeds, when considered in conjunction with the accompanying drawings, in which.

DETAILED DESCRIPTION OF THE INVENTION

The present invention will be described more fully hereinafter with reference to the accompanying drawings, in which preferred embodiments of the invention are shown. This invention can, however, be embodied in many different forms and should not be construed as limited to the embodiments set forth herein; rather, applicants provide these embodiments so that this disclosure will be thorough and complete, and will fully convey the scope of the invention to those skilled in the art.

Figure 1:
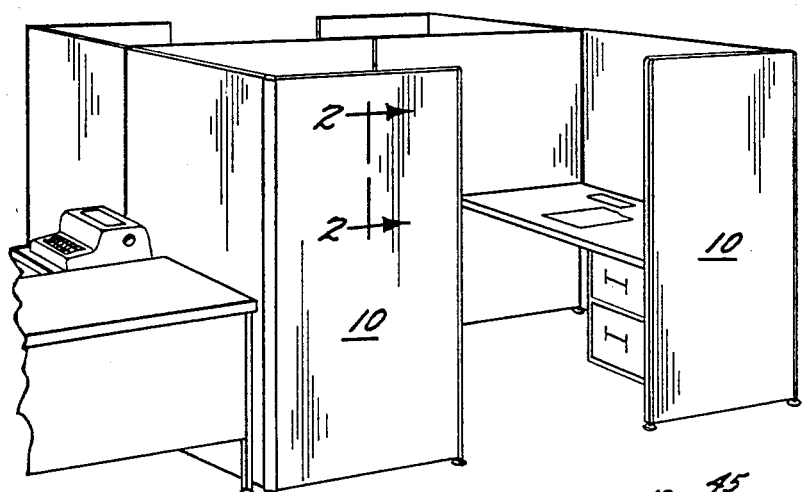
FIG. 1 is an enlarged isometric view of an office panel partition showing it in an office environment in accordance with the invention.
Figure 2:
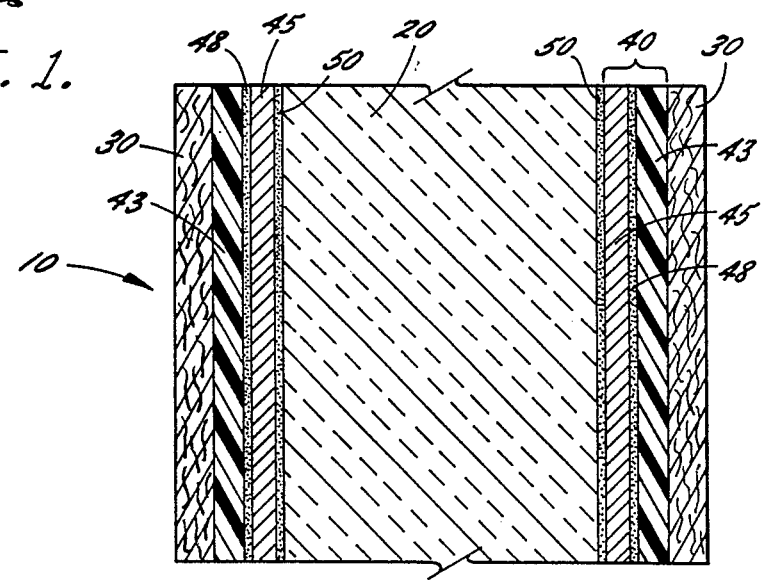
FIG. 2 is a cross-sectional view taken along line 2—2 of FIG. 1 illustrating the different layers of the office panel.
Figure 3:
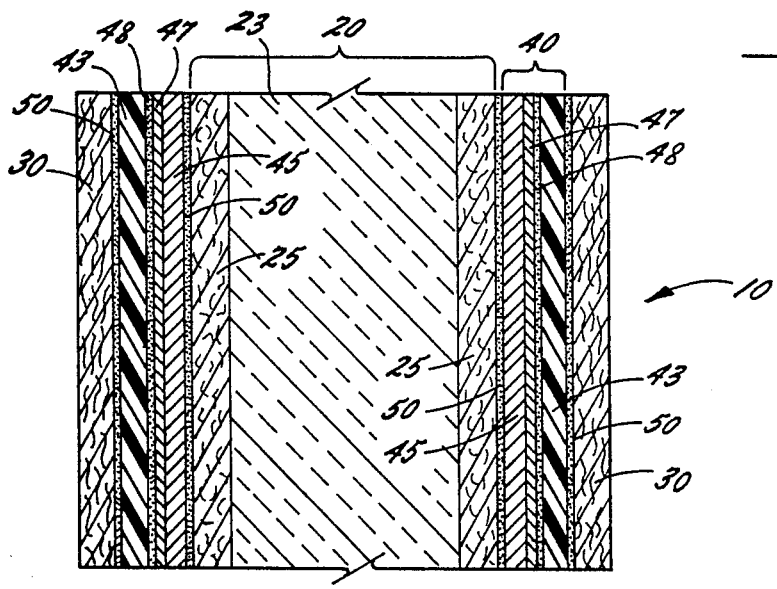
FIG. 3 is a cross-sectional view similar to FIG. 2 illustrating another embodiment of an office building material in accordance with the invention.

Referring now more particularly to the drawings, the office building material of the present invention is generally indicated by the reference character 10. The building material 10 may be used as a partition panel in an office as shown in FIG. 1, or it may be used for such other uses as ceiling panels, wall panels, flooring and the like. As illustrated in FIGS. 2 and 3, the office building material comprises a rigid flammable core support material 20, a decorative outer surface layer 30 and a fiber-based flame barrier layer 40 positioned between the core support material 20 and the decorative surface layer 30.

The rigid core support material 20 may be constructed of any material which will provide structural support and is sufficiently sturdy to carry the decorative outer surface layer 30. The core is conventionally made from a material which is highly flammable and may give off toxic fumes on ignition. Exemplary materials include particle board, corrugated paperboard, plywood or a rigid polymer such as polyurethane, polyvinyl chloride, or polystyrene. A preferred core support material 20 construction is shown in FIG. 3 and comprises a honeycombed corrugated paperboard inner core 23 and a particle board outer core 25.

The decorative outer surface layer 30 may be a sheet or film such as vinyl, or a woven, non-woven or knitted fabric formed of natural fibers, synthetic fibers or blends thereof. Particularly desirable is a fabric construction which provides a pleasing hand to the surface layer 30 and permits a variety of patterns and designs to be incorporated therein for aesthetic appeal.

The fiber-based flame barrier layer 40 comprises a flame durable fabric substrate 43 and a flexible metal foil layer 45. The fabric substrate 43 may be a woven, non-woven or knitted mat formed of fire-resistant fibers. Exemplary fire-resistant fibers include fibers of glass, polybenzimidazole, polyimides, polyarenes, metals, polyamides (i.e. Kevlar ®), polyamides (i.e. Nomex ®), and carbon and carbonizable compounds. Blends of these fibers and fibers of corespun construction such as described in co-pending, commonly assigned U.S. Ser. No. 07/318,239, filed on Mar. 3, 1989 may also be used.

The fabric substrate 43 preferably comprises a non-woven mat made from fire-resistant glass fibers. Fiberglass is preferred because of its cost, non-flammability, high tensile strength and inertness to reaction with other materials. The bonding of these fibers together to form the non-woven mat is preferably accomplished with polymer emulsions or thermosetting resins such as urea formaldehyde, melamine formaldehyde and phenol formaldehyde resins. A preferred non-woven mat is Glasmat® 7513 available from Manville Corporation of Denver, Colo. Such a non-woven mat is formed of chopped staple fiberglass, having a fiber outside diameter greater than about 12 microns, bonded with a urea formaldehyde resin. The basis weight of the mat is about 0.9 pounds per 100 square feet.

The metal foil layer 45 is typically from about 0.25 to 5 mil thick with from about 0.5 to 2 mil being preferred. Suitable flexible and reflective metal foils include aluminum, stainless steel, copper, titanium, gold, silver, platinum and alloys of these metals. Aluminum foil is preferred because of its lightness and its ability to reflect a large amount of the heat generated by the flame. Additionally, the foil layer may be color-coated with an opaque coating 47 to reduce the shininess of the foil which can adversely affect the aesthetic characteristics of the decorative surface layer 30.

The fabric substrate 43 and the metal foil layer 45 are bonded together using a conventional thermoplastic or thermosetting laminating adhesive 48, which is typically in solvent-based, latex or hot melt form. Exemplary adhesives include neoprene, polyamides, polyesters, polyvinylidene chloride (PVDC), polyvinyl chloride (PVC), polyvinyl acetate (PVAc), ethylene-vinyl acetate (EVA), acrylic or blends thereof. The laminating adhesive 48 is selected so that it does not contribute to the amount of the fire or smoke. To this end, the adhesive may be compounded with fire-retardant compositions such as hydrated or halogenated inorganics to reduce the propensity of the adhesive to burn and cause smoke. Also the adhesive may be opacified and/or tinted to reduce the shininess of the foil. Additionally, particularly if glass fibers are used, the laminating adhesive 48 or other sources of boron or phosphorous containing compounds should not act as a flux so as to reduce the melting point of the glass fibers.

The foil layer 45 is oriented so as to be toward the core support material 20. The foil layer 45 (and thus the fire-barrier layer 40) and the rigid core support material 20, and the fire-barrier layer 40 and the decorative surface layer 30 may be bonded together using an adhesive layer 50 similar to the laminating adhesive 48 as employed above with the similar provision that the adhesive selected does not significantly alter the flame resistant properties of the building material. It is recognized that the use of adhesives may be eliminated by stretching the decorative outer surface layer 30 and the flame barrier layer 40 over the core support material 20 and maintaining it in position using mechanical means such as staples or clips.

In the drawings and specification, there have been disclosed preferred embodiments of the invention and, although specific terms are employed, they are used in a generic and descriptive sense only and not for the purpose of limitation, the scope of the invention being set forth in the following claims.

That which is claimed is:

1. An office building material having improved flame resistance properties comprising a rigid core support material, a decorative outer surface layer, and a fiber-based flame barrier layer positioned between said support material and said surface layer, said barrier layer comprising a flame durable fabric substrate formed of fire-resistant fibers and a flexible metal foil layer bonded together, with said metal foil layer oriented toward said support material.

2. An office building material according to claim 1 wherein said fire-resistant fibers are selected from fibers of the group consisting of glass, polybenzimidazole, polyimides, polyarenes, metals, polyamides, polyaramids and carbon and carbonizable compounds and blends thereof.

3. The office building material according to claim 1 wherein said flexible metal foil layer comprises a metal foil selected from the group consisting of aluminum, stainless steel, copper, titanium, gold, silver, platinum and alloys thereof.

4. The office building material according to claim 3 wherein said flexible metal foil layer has a thickness of from about 0.25 to 5 mil.

5. The office building material according to claim 3 wherein said flexible metal foil layer has a thickness of from about 0.5 to 2 mil.

6. The office building material according to claim 1 wherein said rigid core support material comprises a honeycombed corrugated paperboard inner core and a particle board outer core.

7. The office building material according to claim 1 wherein said fabric substrate and said metal foil layer are bonded together using a thermoplastic or thermosetting laminating adhesive.

8. The office building material according to claim 7 wherein said laminating adhesive is selected from the group consisting of neoprene, polyamide, polyester, polyvinylidene chloride, polyvinyl chloride, polyvinyl acetate, ethylene-vinyl acetate, acrylic adhesives and blends thereof.

9. An office building material having improved flame resistance properties comprising a rigid core support material, a decorative surface layer and a fiberglass-based flame barrier layer positioned between said support material and said surface layer, said barrier layer comprising a flame durable non-woven fabric substrate formed from fiberglass and a flexible aluminum foil layer adhesively bonded to said non-woven fabric substrate and oriented toward said support material.

10. The office building material according to claim 9 wherein said flexible aluminum layer has a thickness of from about 0.25 to 5 mil.

11. The office building material according to claim 9 wherein said flexible metal foil layer has a thickness of from about 0.5 to 2 mil.

12. The office building material according to claim 9 wherein said rigid core support material comprises a honeycombed corrugated paperboard inner core and a particle board outer core.

13. The office building material according to claim 9 wherein said non-woven fabric substrate and said flexible aluminum foil layer are bonded together using a thermoplastic or thermosetting laminating adhesive.

14. The office building material according to claim 13 wherein said laminating adhesive is selected from the group consisting of neoprene, polyamide, polyester, polyvinylidene chloride, polyvinyl chloride, polyvinyl acetate, ethylene-vinyl acetate, acrylic adhesives and blends thereof.

* * * * *